(12) United States Patent
Kates

(10) Patent No.: US 7,228,726 B2
(45) Date of Patent: Jun. 12, 2007

(54) SYSTEM AND METHOD FOR UTILITY METERING AND LEAK DETECTION

(76) Inventor: Lawrence Kates, 1111 Bayside Dr., Corona Del Mar, CA (US) 92625

( * ) Notice: Subject to any disclaimer, the term of this patent is extended or adjusted under 35 U.S.C. 154(b) by 0 days.

(21) Appl. No.: 10/948,628

(22) Filed: Sep. 23, 2004

(65) Prior Publication Data
US 2006/0059977 A1 Mar. 23, 2006

(51) Int. Cl.
*G01M 3/04* (2006.01)
(52) U.S. Cl. ............ 73/40; 340/632; 340/870.02
(58) Field of Classification Search .......... 73/40
See application file for complete search history.

(56) References Cited

U.S. PATENT DOCUMENTS

| | | | |
|---|---|---|---|
| 4,437,336 A | | 3/1984 | Abe |
| 4,777,474 A | | 10/1988 | Clayton |
| 4,811,011 A | * | 3/1989 | Sollinger ............ 340/870.02 |
| 5,267,587 A | | 12/1993 | Brown |
| 5,377,529 A | | 1/1995 | Boyd ............ 73/40 |
| 5,432,500 A | | 7/1995 | Scripps |
| 5,715,308 A | | 2/1998 | Shankarappa |
| 5,920,265 A | | 7/1999 | Johnson, Jr. et al. |
| 2003/0199247 A1 | | 10/2003 | Striemer |
| 2005/0035877 A1 | * | 2/2005 | Kim ............ 340/870.02 |
| 2005/0258974 A1 | * | 11/2005 | Mahowald ............ 340/632 |
| 2007/0008157 A1 | | 1/2007 | Siemens et al. |

FOREIGN PATENT DOCUMENTS

| | | |
|---|---|---|
| EP | 0 346 152 A2 | 12/1989 |
| EP | 0 346 152 A3 | 12/1989 |
| EP | 0 580 298 A2 | 1/1997 |
| EP | 0 930 492 A1 | 7/1999 |
| GB | 2278471 A * | 11/1994 |
| WO | WO 00/21047 A1 | 4/2000 |

OTHER PUBLICATIONS

Seger, Paul H., "Measurement & Instrumentation: When Will We Have Integrated Metering," http://www.gasindustries.com/articles/jun03c.html, 5 pages.
Product Overview of DIALOG 3-G-Wireless RF, http://www.mastermeter.com/cms/product.html?category=Automatic%20Meter%20Reading&cid=113, 1 page.

(Continued)

*Primary Examiner*—Daniel S. Larkin
(74) *Attorney, Agent, or Firm*—Knobbe, Martens, Olson & Bear, LLP

(57) ABSTRACT

The system and method for detecting water and/or gas leaks by monitoring usage patterns is described. In one embodiment, the existence of a leak is detected by looking for usage patterns wherein water or gas is always being used, at least at a low rate. A leak is indicated if usage does not drop to zero, at least for a period of time, during a given time interval (e.g., during a 24-hour period). The severity of the leak is indicated by the minimum amount of usage during the given time period. In one embodiment, the leak detection system is provided in connection with an Automatic Meter Reading (AMR) system.

16 Claims, 12 Drawing Sheets

OTHER PUBLICATIONS

Product Overview of Meter Interface Unit, http://www.archnetco.com/english/product/meter2.html, 2 pages.

"Do Future Trends Favour Automatic Meter Reading," Metering International Issue 2 1997, http://www.metering.com/archive/972/14_1.html, Copyright 2000, 4 pages.

"Low-Cost Multi-Service Home Gateway Creates New Business Opportunities," Coactive Networks, Copyright 1998-1999, 7 pages.

Texas Instruments, Inc., Product catalog for "TRF6901 Single-Chip RF Transceiver," Copyright 2001-2003, 27 pages.

Texas Instruments, Inc., Mechanical Data for "PT (SPQFP-G48) Plastic Quad Flatpack," 2 pages.

Vandana P. Janeja et al., "DM-AMS: Employing Data Mining Techniques for Alert Management," ACM International Conference Proceeding Series, vol. 89, pp. 103-111, 2005.

* cited by examiner

SYSTEM AND METHOD FOR UTILITY METERING AND LEAK DETECTION

BACKGROUND OF THE INVENTION

1. Field of the Invention

The present invention relates to a system and method for electronic utility (e.g., water and gas) metering and leak detection.

2. Description of the Related Art

In a home or building, utilities such as water and gas are used for various reasons throughout the day and night. For example, in homes, water is used randomly and for varying time intervals through the day and night. Although water usage tends to be less at night, water is still used (e.g., for toilets, automatic sprinklers, etc.). The water usage in commercial buildings follows a similar pattern. This makes it difficult to test for leaks, since there is no predictable time during the day or night that water usage drops to zero.

As is known, some waterline leaks can be easily detected because of the presence of detected ground water or the presence of water puddles in the vicinity of a water pipe. However, other waterline leaks go undetected until a water bills become unusually high or water damage is discovered.

Gas leaks are potentially more dangerous than water leaks, and can be more difficult to detect.

Owners of large apartment buildings and commercial buildings face additional problems in monitoring water usage and leak detection. The amount of water and other utilities used by such commercial structures is typically much larger than the usage of a residence or other smaller structure. Moreover, the plumbing and sprinkler systems of such structures tend to be more complex than the systems found in a residence. Thus, any inefficiencies in the usage of utilities is magnified in a large commercial structure, and the costs of such inefficiencies are magnified. For example, in a large commercial structure, water is used for toilets, industrial processes, heating and air-conditioning, fire sprinkler systems, and irrigation sprinkler systems. The management of a large commercial building often does not have an accurate accounting of water usage by the various systems. A maintenance issue as minor as a broken irrigation sprinkler head can cause increased and unnecessary water usage.

Conventional water and gas meters used in connection with residential and commercial structures measure the total amount of water or gas used, but do not monitor the usage patterns. Thus, conventional meters do not provide the information needed to detect leaks.

SUMMARY

The system and method disclosed herein solves these and other problems by detecting water and/or gas leaks by monitoring usage patterns. In one embodiment, the existence of a leak is detected by looking for usage patterns wherein water or gas is always being used, at least at a low rate. A leak is indicated if usage does not drop to zero (or below some threshold value), at least for a period of time, during a given time interval (e.g., during a 24-hour period). The severity of the leak is indicated by the minimum amount of usage during the given time period. In one embodiment, the leak detection system is provided in connection with an Automatic Meter Reading (AMR) system.

In one embodiment, an imaging sensor is provided to a water or gas meter to read various dials on the meter. In one embodiment, an optical sensor is provided to a water or gas meter to read movement of a lowest-level dials or indicator on the meter. In one embodiment, an acoustic sensor is provided to a water or gas meter to detect flow through the meter.

In one embodiment, the monitoring system interrupts utility service if utility usage exceeds a set maximum during a given time period. Excess water usage can occur, for example, if a water line breaks, a building owner exceeds usage limits, etc. Excess gas usage can occur, for example, if a thermostat fails, if a pool heater is left on accidentally, if a stove is left on accidentally, etc. Thus, for example, the monitoring system can be configured to shut off utility service (or notify the utility to shut off service) if water or gas usage exceeds a maximum during a specified time period (e.g., one hour, one day, one week, etc.).

DETAILED DESCRIPTION OF THE PREFERRED EMBODIMENT

Figure 1A:
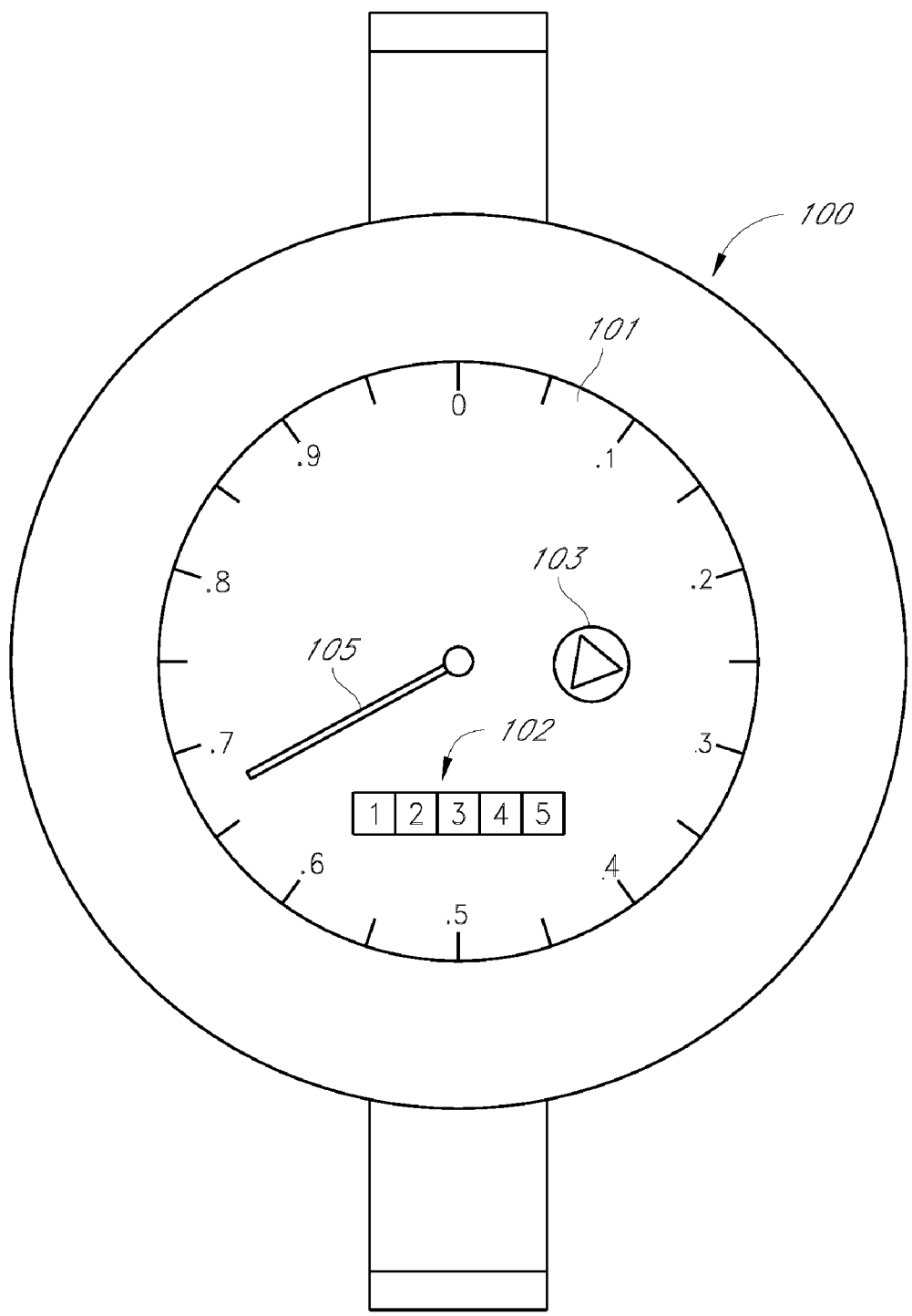
FIG. 1A shows a dial face of a typical water meter register.

FIG. 1A shows a dial face of a typical water meter register 100. The register includes a digital indicator 102 that reads water used in cubic ft, a radial dial 101 and radial hand 105 that indicate water usage between 0 and 1 cu ft, and a low-flow indicator 103 that makes several rotations for each rotation of the radial hand 105.

Figure 1B:
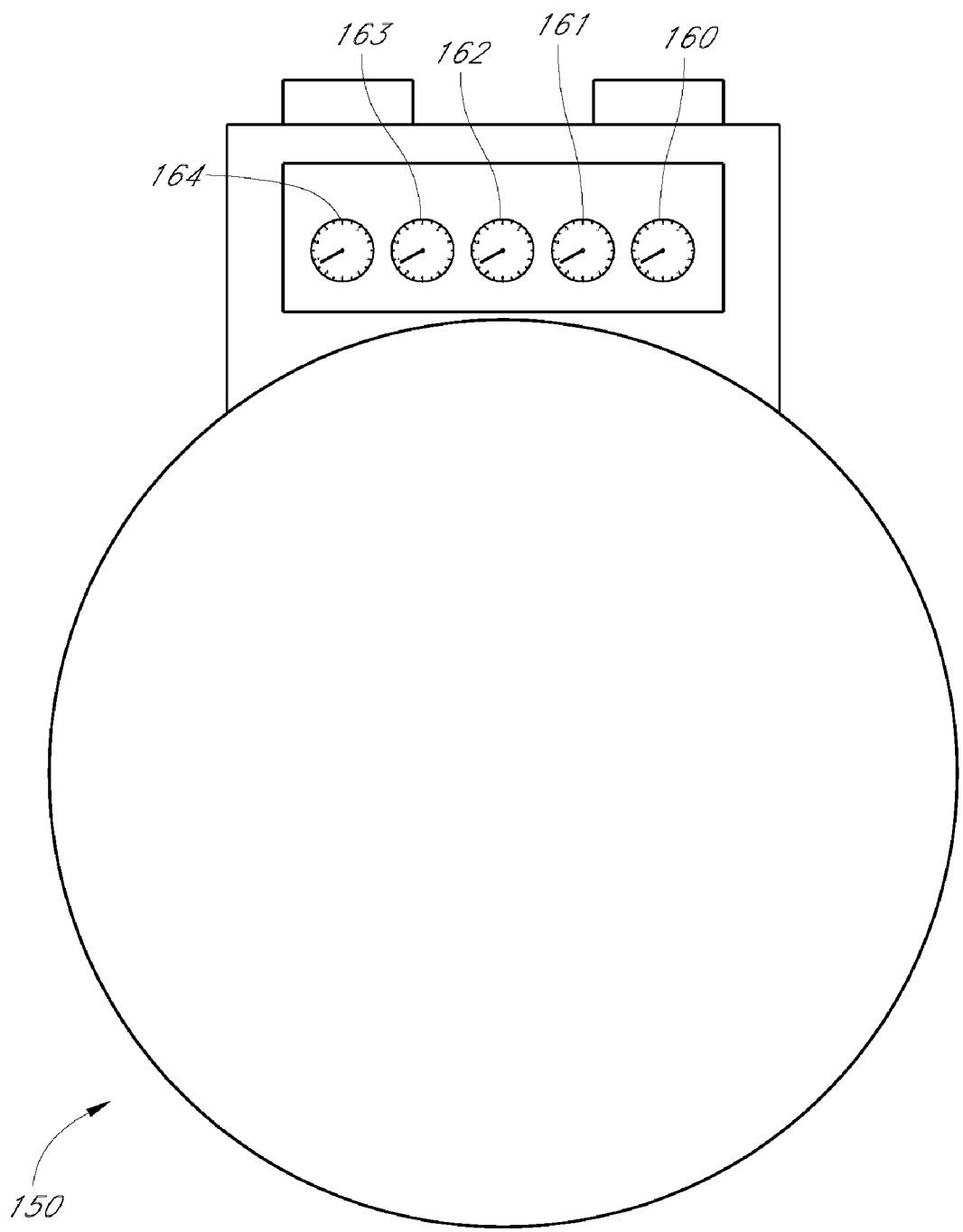
FIG. 1B shows a dial face of a typical gas meter register.

FIG. 1B shows a typical gas meter 150. In the meter 150, a group of radial dials 160-164 display digits corresponding to gas usage in cubic ft. In FIG. 1B, the least-significant digit is displayed by the dial 160 and the most significant digit is displayed by the dial 164. The dial 160 is similar in effect to the low-flow indicator 103.

Historically, the utility meters shown in FIGS. 1A and 1B were read manually on a periodic basis. Many communities have converted to Automatic Meter Reading (AMR) systems wherein the register is read electronically and remotely. The Automatic Meter Reading system allows the utility company to save on meter reading costs, provide better information about utility use, and provide more accurate billings. Because the AMR systems reduce our meter reading and meter maintenance costs, the systems typically pay for themselves very quickly.

In addition to, or in lieu of, the benefit provided to the utility company the AMR system can also be used by the building owner or manager to provide utility information for a building management system to provide cost tracking, maintenance diagnostics, leak detection, etc. Thus, in one embodiment, data from the AMR is provided to a monitoring system such as, for example, a building monitoring system, a home computer system, etc.

Water and gas AMR systems are similar in nature, and so much of the following discussion refers to water meters with the understanding that the techniques used for water meters can also be used for gas meters. Most AMR systems use miniature radio transmitters attached to the water meter register 100. Data from the AMR meter can be collected by readings from handheld radio receivers, from moving vehicles, or from fixed receivers (e.g., mounted in the building, mounted on light poles, etc.). With this process, one driver in a truck is able to read more meters in one day than an entire staff of meter readers. The AMR systems also alleviates access problems, since the utility company does not need access to the meter in order to obtain a reading. The system also allows the building owner or manager to collect utility meter data on a regular (or even continuous) basis.

Figure 2:
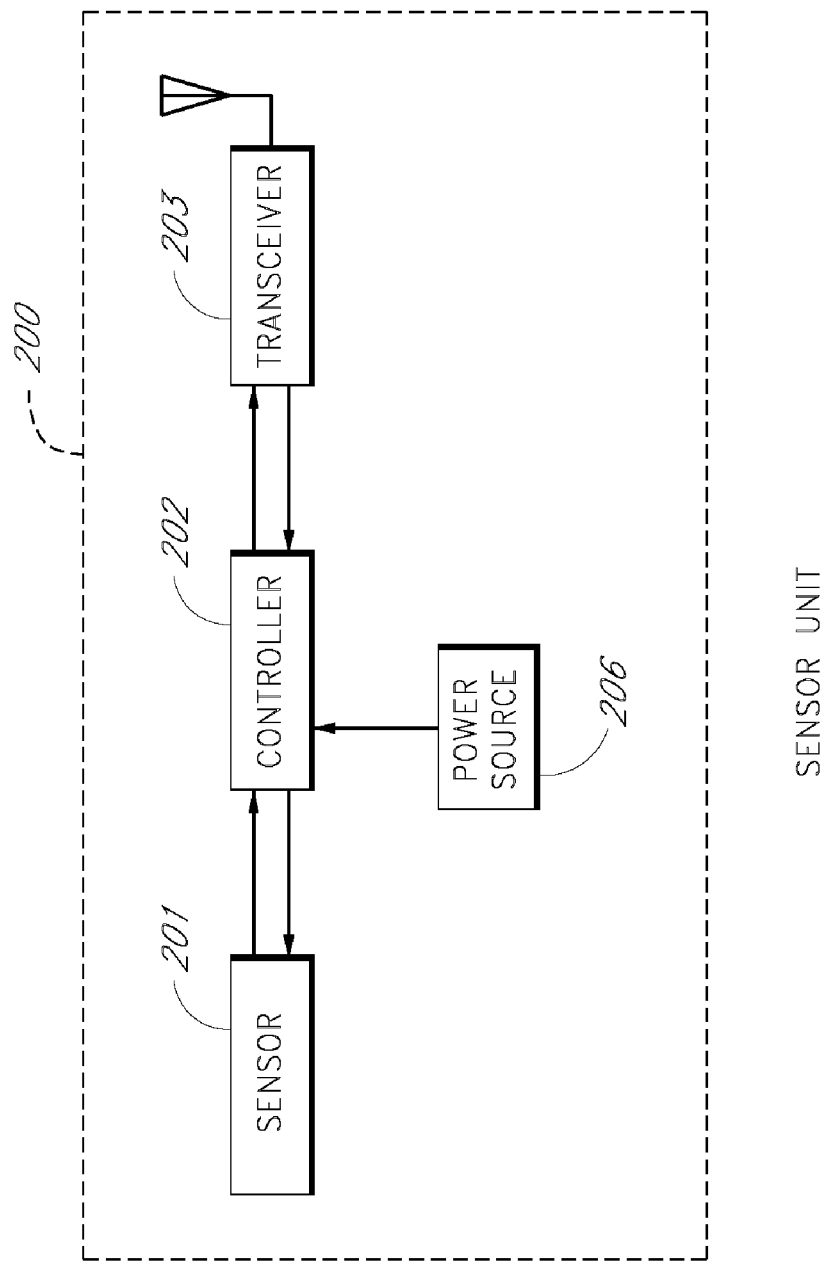
FIG. 2 is a block diagram of an automatic meter reading system for use in connection with a leak detection system.

In an AMR system, the utility meter is equipped with an Encoder-Receiver-Transmitter (ERT) device. FIG. 2 is a block diagram of an Encoding-Transmitting-Receiving (ETR) ETR unit 200 for use in connection with a utility meter. In the ETR unit 200, one or more sensors 201 and a transceiver 203 are provided to a controller 202. The controller 202 typically provides power, data, and control information to the sensor(s) 201 and the transceiver 202. A power source 206 is provided to the controller 202. An optional tamper sensor (not shown) is also provided to the controller 202.

In one embodiment, the transceiver 203 is configured for wireless communication. In on one embodiment, the transceiver 203 is configured for wire or fiber-optic communication on a computer network, telephone network, etc.

Figure 3:
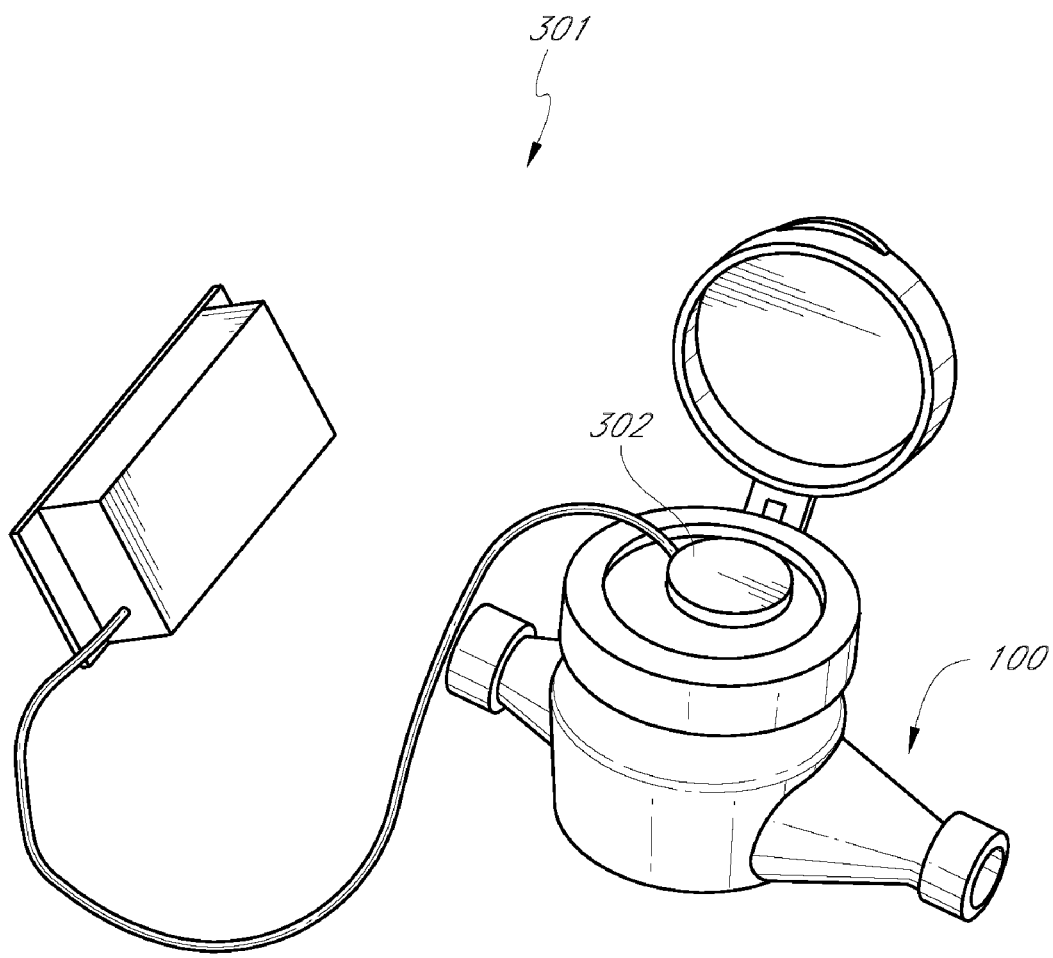
FIG. 3 illustrates the leak-detection AMR system provided to a water meter in a retrofit installation.
Figure 5:
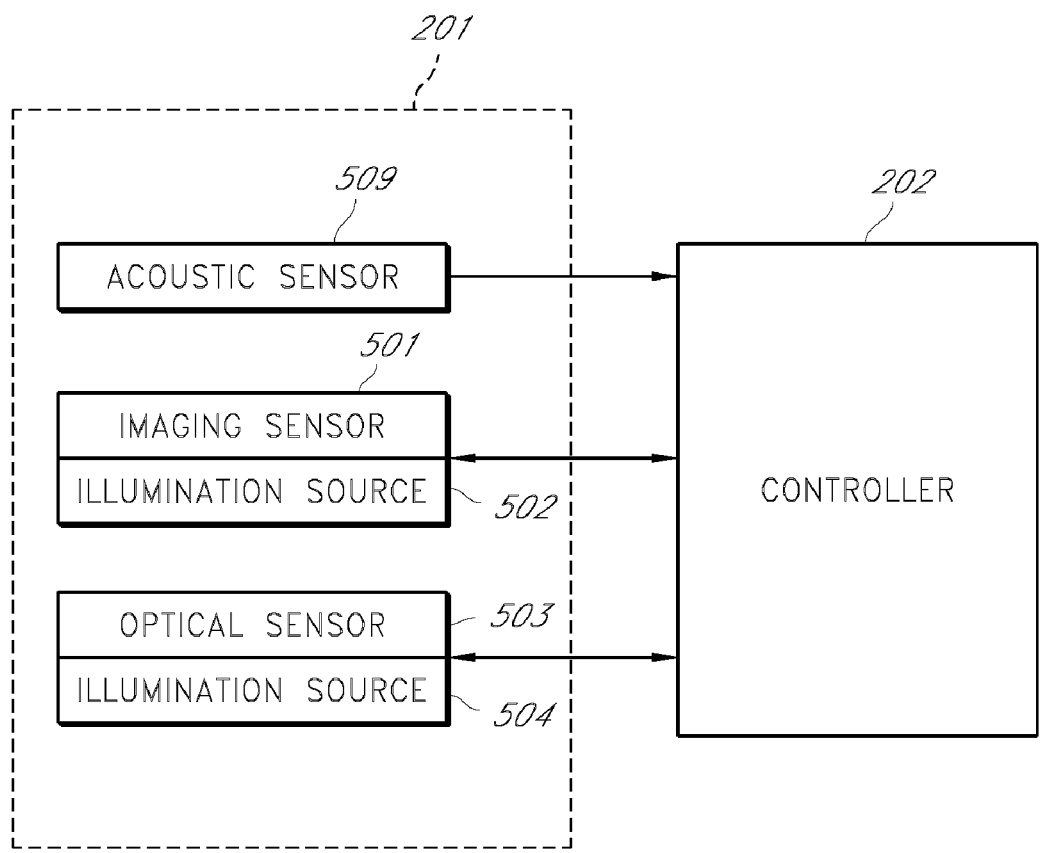
FIG. 5 is a block diagram illustrating various sensors that can be used to detect low-level flow through a water meter or gas meter.

FIG. 3 illustrates the leak-detection AMR system 301 provided to a water meter in a retrofit installation. The sensors 201 are configured as a sensor module 302 that is provided to the meter to read the meter register. FIG. 5 describes various sensors that can be used to read a conventional (non-electronic) register. In one embodiment, the sensors 201 read the low-flow indicator, such as, for example, a low-flow indicators shown in FIG. 1A or 1B. In one embodiment, the sensors 201 read the low-flow indicator using an imaging sensor such as, for example, a CCD or CMOS imaging sensor. In one embodiment, the sensors 201 read the low-flow indicator using an illumination source and an optical sensor, such as, for example, a photodiode, phototransistor, or array of such. In one embodiment, the sensors 201 read the low-flow indicator without substantially obscuring the other indicators of the meter. In one embodiment, the sensors 201 are positioned to the side of the low-flow indicator such that the low-flow indicator is still visible.

Figure 4:
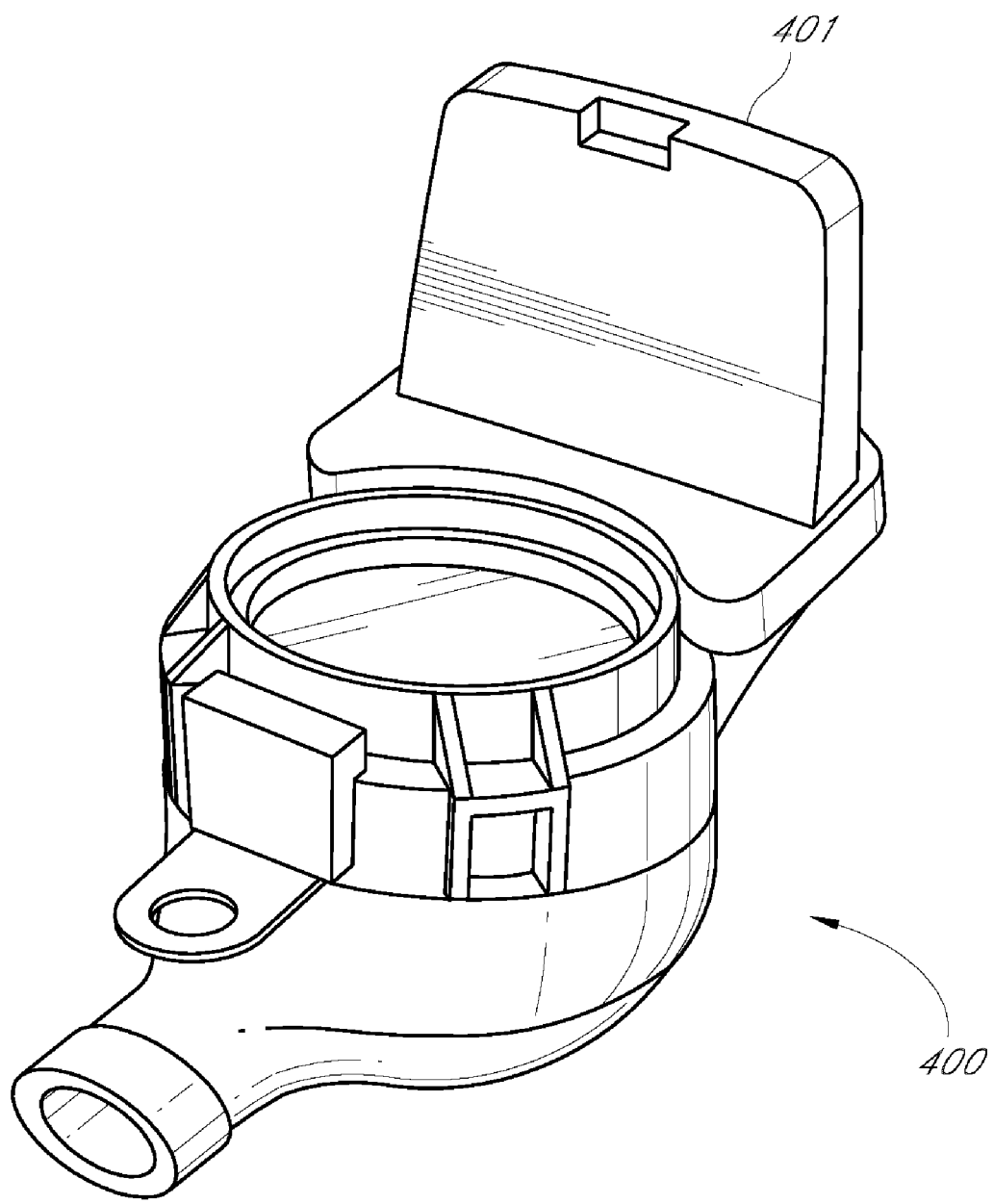
FIG. 4 illustrates the leak-detection AMR system provided to a water meter as original equipment.

FIG. 4 illustrates the leak-detection AMR system 400 provided to a water meter as original equipment. In FIG. 4, the ERT 401 (which includes the ETR 200) is provided directly to an electronic register on the water meter.

In a conventional AMR system, the ERT does not take continuous readings, but rather "sleeps," waiting for the meter reader to approach. The meter reader's truck-mounted reading device sends out a continuous "wake up" signal. When an ERT receives a wake up signal, it checks the reading on the meter register, encodes it into a digital signal, and begins transmitting its identification number and the current reading. After a few minutes, the ERT stops transmitting and goes back "to sleep," waiting for the next "wake up" signal. The truck-mounted computer system matches the ERT identification number with your property and records the reading. At the end of the day, the meter reader unloads the information to the utility company billing system.

The ERT is an electronic device designed to read the meter register and transmit the signal. The radio signals used to wake up the ERT and to transmit the signals are relatively weak, typically operating in the 900 MHz frequency band. The devices are usually powered by two long-lasting batteries, designed to last 15 to 20 years. Pit ERTs are usually used for meters located in pits outside the building. Remote ERTs are used when the meter is inside the building or when the ERT needs to be located some distance away from the meter.

The pit ERT mounts directly on the cast iron or concrete lid of an outdoor meter pit. It is typically sturdy enough to stand up to the weather and a certain amount of traffic load. In one embodiment, the ERT looks like a black mushroom with a 7-inch diameter cap and a 2-inch diameter "stem" that passes through a hole in the lid. A wire connects the ERT to the meter register. In sidewalks, a special lid is used that holds the ERT underneath and out of the way of pedestrians.

In one embodiment, the monitoring system includes a battery-operated ETR unit 200 that detects a condition, such as, for example, water or gas flow. The ETR unit is provided to a utility meter for a building, apartment, office, residence, etc. In order to conserve battery power, the ETR unit is normally placed in a low-power mode. In one embodiment, while in the low power mode, the ETR unit takes regular sensor readings and evaluates the readings to determine if an anomalous condition exists. In response to a wake-up signal, the ETR unit also "wakes up" and sends status information to the base unit (or reading device) and then listens for commands for a period of time.

In one embodiment, the ETR unit 200 is bi-directional and configured to receive instructions from the reading device. Thus, for example, the reading device can instruct the sensor to: perform additional measurements; go to a standby mode; wake up; report battery status; change wake-up interval; run self-diagnostics and report results; etc. In one embodiment, the ETR unit also includes a tamper switch. When tampering with the sensor is detected, the sensor reports such tampering to the base unit. In one embodiment, the ETR unit reports its general health and status to the reading device (e.g., results of self-diagnostics, battery health, etc.).

In one embodiment, the ETR unit provides two wake-up modes, a first wake-up mode for taking measurements (and reporting such measurements if deemed necessary), and a second wake-up mode for listening for commands from the reading device. The two wake-up modes, or combinations thereof, can occur at different intervals.

In one embodiment, the ETR unit uses spread-spectrum techniques to communicate with the base unit and/or the reading device. In one embodiment, the ETR units use frequency-hopping spread-spectrum. In one embodiment, each ETR unit has an Identification code (ID) and the ETR units attaches its ID to outgoing communication packets. In one embodiment, when receiving wireless data, each ETR unit ignores data that is addressed to other ETR units.

In one embodiment, the ETR unit 200 provides bi-directional communication and is configured to receive data and/or instructions from the reading device. Thus, for example, the reading device can instruct the ETR unit 200 to perform additional measurements, to go to a standby mode, to wake up, to report battery status, to change wake-up interval, to run self-diagnostics and report results, etc. In one embodiment, the ETR unit 200 reports its general health and status on a regular basis (e.g., results of self-diagnostics, battery health, etc.)

In one embodiment, the ETR unit 200 provides two wake-up modes, a first wake-up mode for taking measurements (and reporting such measurements if deemed necessary), and a second wake-up mode for listening for commands from the reading device. The two wake-up modes, or combinations thereof, can occur at different intervals.

In one embodiment, the ETR unit 200 uses spread-spectrum techniques to communicate with the reading device. In one embodiment, the ETR unit 200 uses frequency-hopping spread-spectrum. In one embodiment, the ETR unit 200 has an address or identification (ID) code that distinguishes the ETR unit 200 from the other ETR units. The ETR unit 200 attaches its ID to outgoing communication packets so that transmissions from the ETR unit 200 can be identified by the reading device. The reading device attaches the ID of the ETR unit 200 to data and/or instructions that are transmitted to the ETR unit 200. In one embodiment, the ETR unit 200 ignores data and/or instructions that are addressed to other ETR units.

In one embodiment, the sensor 201 communicates with the reading device on the 900 MHz band. This band provides good transmission through walls and other obstacles normally found in and around a building structure. In one embodiment, the sensor communicates with the reading device on bands above and/or below the 900 MHz band. In one embodiment, the sensor, reading device, and/or base unit listen to a radio frequency channel before transmitting on that channel or before beginning transmission. If the channel is in use, (e.g., by another device such as another reading device, a cordless telephone, etc.) then the sensor, reading device, and/or base unit changes to a different channel. In one embodiment, the sensor, reading device, and/or base unit coordinate frequency hopping by listening to radio frequency channels for interference and using an algorithm to select a next channel for transmission that avoids the interference. Thus, for example, in one embodiment, if a sensor senses a dangerous condition and goes into a continuous transmission mode, the sensor will test (e.g., listen to) the channel before transmission to avoid channels that are blocked, in use, or jammed. In one embodiment, the sensor continues to transmit data until it receives an acknowledgement from the base unit that the message has been received. In one embodiment, the sensor transmits data having a normal priority (e.g., status information) and does not look for an acknowledgement, and the sensor transmits data having elevated priority (e.g., excess smoke, temperature, etc.) until an acknowledgement is received.

Frequency-hopping wireless systems offer the advantage of avoiding other interfering signals and avoiding collisions. Moreover, there are regulatory advantages given to systems that do not transmit continuously at one frequency. Channel-hopping transmitters change frequencies after a period of continuous transmission, or when interference is encountered. These systems may have higher transmit power and relaxed limitations on in-band spurs.

In one embodiment, the ETR unit 200, the reading device, and the reading device communicate using FHSS wherein the frequency hopping of the ETR unit 200, the reading device, and the reading device are not synchronized such that at any given moment, the ETR unit 200 and the reading device are on different channels. In such a system, the reading device communicates with the ETR unit 200 using the hop frequencies synchronized to the reading device rather than the ETR unit 200. The reading device then forwards the data to the ETR unit using hop frequencies synchronized to the ETR unit 200. Such a system largely avoids collisions between the transmissions by the reading device and the reading device.

In one embodiment, the ETR unit 200 uses FHSS and different ETR unit 200 are not synchronized. Thus, at any given moment, it is unlikely that any two or more of the ETR units will transmit on the same frequency. In this manner, collisions are largely avoided. In one embodiment, collisions are not detected but are tolerated by the system 100. If a collisions does occur, data lost due to the collision is effectively re-transmitted the next time the ETR units transmit sensor data. When the ETR units and operate in asynchronous mode, then a second collision is highly unlikely because the units causing the collisions have hopped to different channels. In one embodiment, the ETR units, and the reading device use the same hop rate. In one embodiment, the ETR units and the reading device use the same pseudo-random algorithm to control channel hopping, but with different starting seeds. In one embodiment, the starting seed for the hop algorithm is calculated from the ID of the ETR units or the reading device.

In an alternative embodiment, the base unit communicates with the ETR unit 200 by sending a communication packet addressed to the reading device, where the packet sent to the reading device includes the address of the ETR unit 200.

In one embodiment, the transceiver 203 is based on a TRF 6901 transceiver chip from Texas Instruments, Inc. In one embodiment, the controller 202 is a conventional programmable microcontroller. In one embodiment, the controller 202 is based on a Field Programmable Gate Array (FPGA), such as, for example, provided by Xilinx Corp. In one embodiment, the sensor 201 includes an optoelectric sensor configured to detect movements of a display on the utility meter. In one embodiment, the sensor 201 includes an imaging sensor configured to read the utility meter. In one embodiment, the sensor 201 includes an illumination device for illuminating the utility meter display. In one embodiment, the sensor 201 includes an acoustic sensor for detecting the acoustic sounds of flow through the utility meter. In one embodiment, the sensor 201 includes a register sensor for reading an electronic utility meter register.

The controller 202 receives sensor data from the sensor(s) 201. Some sensors 201 produce digital data. However, for many types of sensors 201, the sensor data is analog data.

Analog sensor data is converted to digital format by the controller 202. In one embodiment, the controller evaluates the data received from the sensor(s) 201 and determines whether the data indicates a leak or other anomalous condition. In one embodiment, the controller 202 evaluates the sensor data by comparing the data value to a threshold value (e.g., a high threshold, a low threshold, or a high-low threshold). If the data is outside the threshold (e.g., above a high threshold, below a low threshold, outside an inner range threshold, or inside an outer range threshold), then the data is deemed to be anomalous or indicative of a leak. In one embodiment, the data threshold is programmed into the controller 202. In one embodiment, the data threshold is programmed by the reading device by sending instructions to the controller 202.

FIG. 5 is a block diagram illustrating various sensors that can be used to detect low-level flow through a water meter or gas meter. In one embodiment, an acoustic sensor is provided to the meter to detect flow through the meter. In one embodiment, an imaging sensor 501 is provided to the meter to read the digital indicator 102 and/or the dials 160-164. In one embodiment, an illumination source 502 is provided to illuminate the digital indicator 102 and/or the dials 160-164 for the imaging sensor 501. In one embodiment, an illumination source 504 and optical sensor 503 are provided to detect movement of the radial hand 105 and/or the fine sensor 103. The acoustic sensor 509, the imaging sensor 501, and/or the optical sensor 503 are embodiments of the sensor 201 shown in FIG. 2. Other sensors, such as, for example, magnetic sensors, can be used in combination with the acoustic sensor 509, the imaging sensor 501, and/or the optical sensor 503 or used the alternative.

The acoustic sensor 509, the imaging sensor 501, and/or the optical sensor 503 are provided to the controller 202. The controller reads the utility meter by collecting data from the acoustic sensor 509, the imaging sensor 501, and/or the optical sensor 503.

In one embodiment, the controller 202 reads the sensors 201 at regular periodic intervals. In one embodiment, the controller 202 reads the sensors 201 at random intervals. In one embodiment, the controller 202 reads the sensors 201 in response to a wake-up signal from the reading device. In one embodiment, the controller 202 sleeps between sensor readings.

In one embodiment, the controller 202 reads the fine detail indicator 103 or the lowest-order indicator 160 on a regular (or random) basis in order to detect leaks. In one embodiment, the controller 202 wakes up and takes a series of readings from the low-flow indicator 103 or the lower-order indicator 160 on a programmed basis to determine usage patterns and for leak detection. If the controller 202 determines that utility usage appears to be continuous then the controller 202 assumes a leak exists.

In one embodiment, the controller 202 uses artificial intelligence to determine a sensor reading interval. In one embodiment, the controller 202 reads the low-flow indicators on a period basis. If the controller 202 determines that usage is zero during a prescribed number of intervals, then the controller assumes that no leak exists and the controller can program a relatively long interval between readings. If the controller determines that usage is never zero, then the controller 202 assumes that a leak may exist, and the controller can program a relatively shorter interval between readings in order to search for an interval when no usage occurs. If the relatively shorter interval still does not produce a zero reading, then the controller 202 can, in one embodiment, take continuous readings for a period of time (e.g., 24 hours, 48 hours, etc.) to search for a period when no usage occurs. If the controller is unable to find a period when usage is zero, then the controller reports a leak condition. In one embodiment, the controller 202 reports minimum utility usage to the query device to allow the utility company to evaluate possible leak conditions.

In one embodiment, the controller 202 is configured to use a threshold value (rather than zero) in making determinations regarding possible leak conditions.

Figure 6:
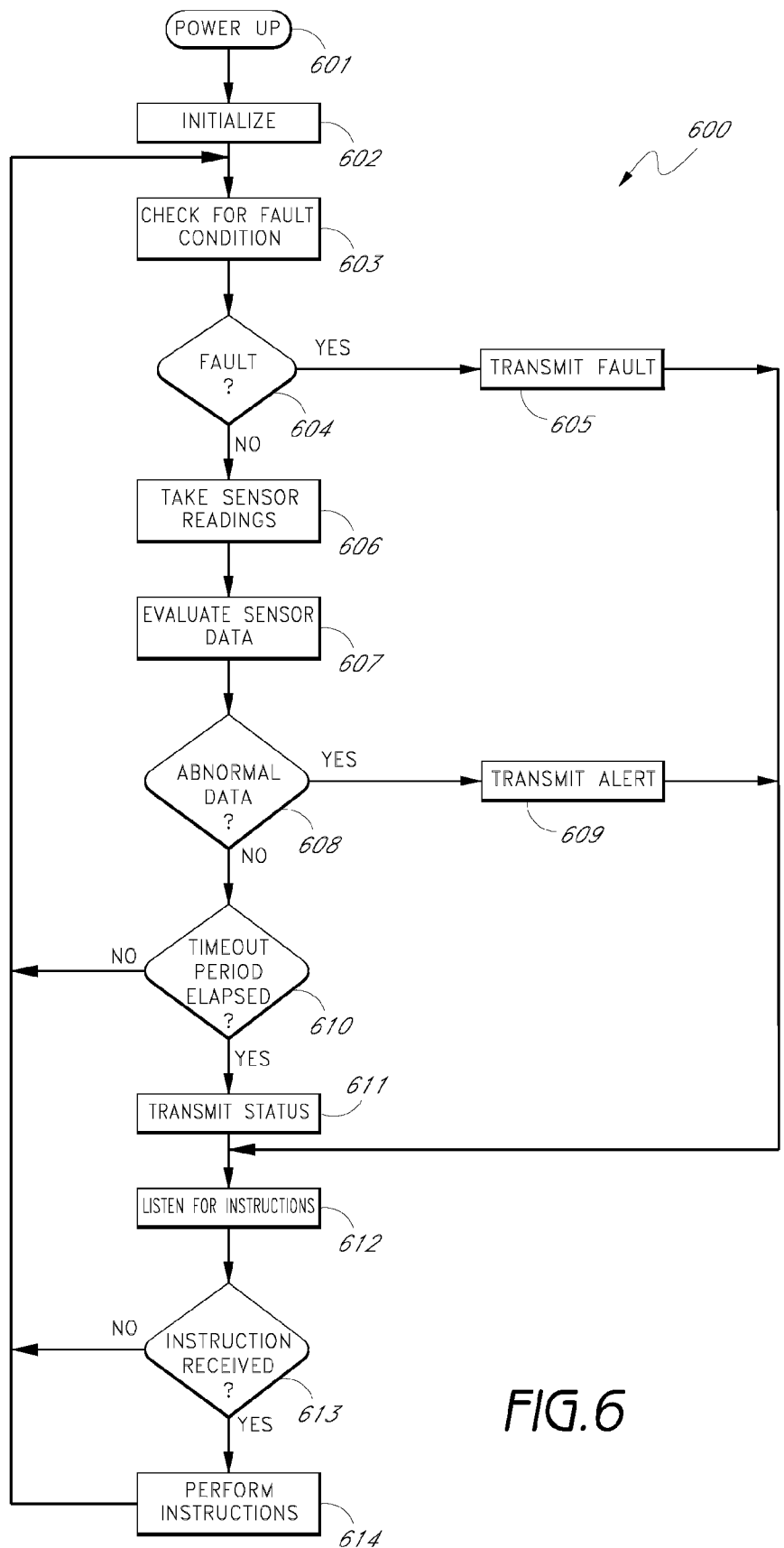
FIG. 6 is a flowchart showing one embodiment of the operation of the ETR unit wherein relatively continuous monitoring is provided.

FIG. 6 is a flowchart 600 showing one embodiment of the operation of the ETR unit 200 wherein relatively continuous monitoring is provided. In FIG. 6, a power up block 601 is followed by an initialization block 602. After initialization, the ETR unit 200 checks for a fault condition (e.g., activation of the tamper sensor, low battery, internal fault, etc.) in a block 603. A decision block 604 checks the fault status. If a fault has occurred, then the process advances to a block 605 were the fault information is transmitted to the reading device (after which, the process advances to a block 612); otherwise, the process advances to a block 606. In the block 606, the ETR unit 200 takes a sensor reading from the sensor(s) 201. The sensor data is subsequently evaluated in a block 607. If (block 608) the sensor data is abnormal, then the process advances to a transmit block 609 where the sensor data is transmitted to the reading device (after which, the process advances to a block 612); otherwise, the process advances to a timeout decision block 610. If the timeout period has not elapsed, then the process returns to the fault-check block 603; otherwise, the process advances to a transmit status block 611 where normal status information is transmitted to the reading device. In one embodiment, the normal status information transmitted is analogous to a simple "ping" which indicates that the ETR unit 200 is functioning normally. After the block 611, the process proceeds to a block 612 where the ETR unit 200 momentarily listens for instructions from the monitor reading device. If (block 613) an instruction is received, then the ETR unit 200 performs the instructions (block 614), otherwise, the process returns to the status check block 603. In one embodiment, transceiver 203 is normally powered down. The controller 202 powers up the transceiver 203 during execution of the blocks 605, 609, 611, and 612. The monitoring reading device can send instructions to the ETR unit 200 to change the parameters used to evaluate data used in block 607, the listen period used in block 612, etc.

Figure 7:
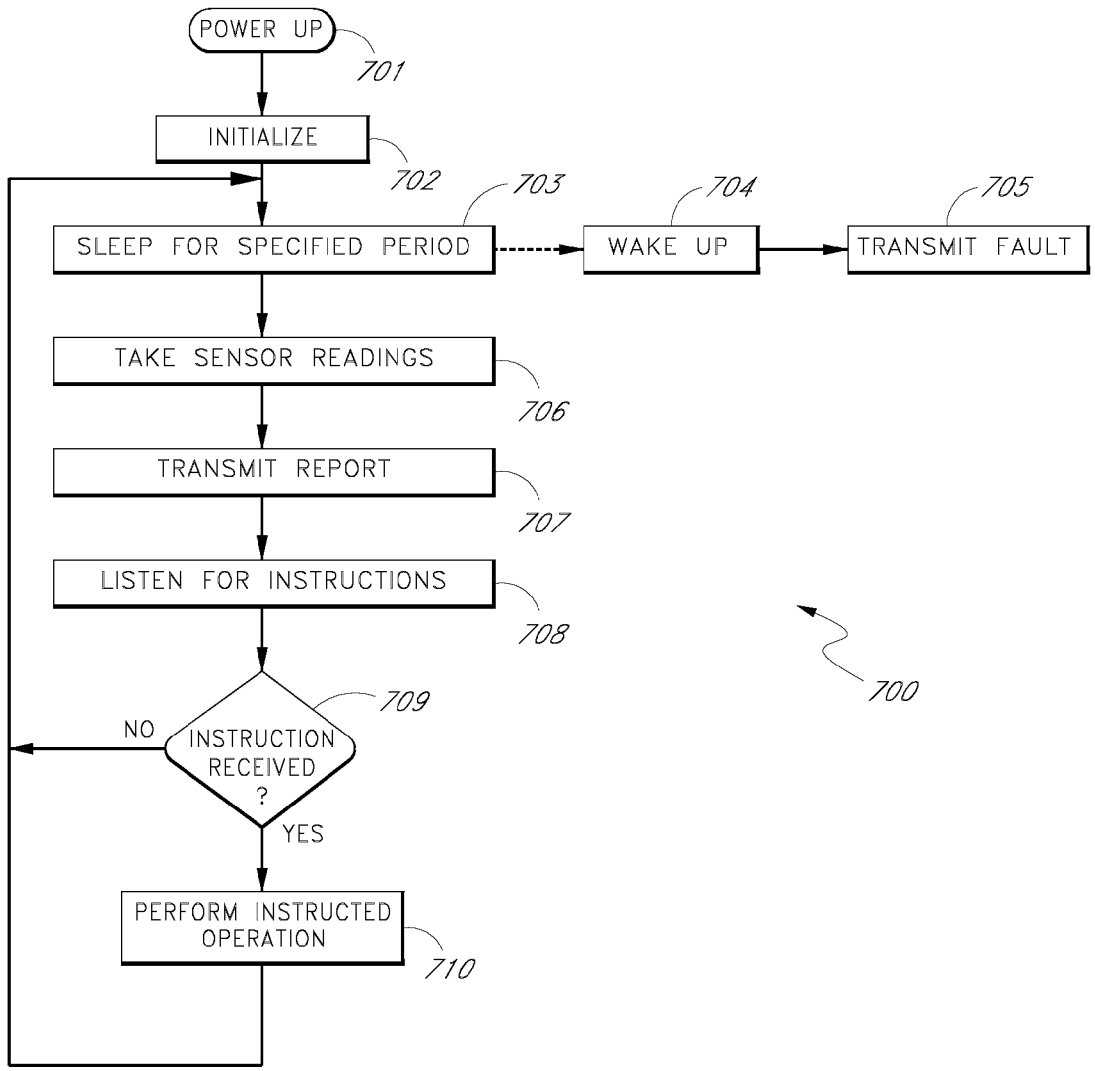
FIG. 7 is a flowchart showing one embodiment of operation of the ETR unit wherein periodic monitoring is provided.

Relatively continuous monitoring, such as shown in FIG. 6, is appropriate for ETR units that sense relatively high-priority data (e.g., smoke, fire, carbon monoxide, flammable gas, etc.). By contrast, periodic monitoring can be used for sensors that sense relatively lower priority data (e.g., humidity, moisture, water usage, etc.). FIG. 7 is a flowchart 700 showing one embodiment of operation of the ETR unit 200 wherein periodic monitoring is provided. In FIG. 7, a power up block 701 is followed by an initialization block 702. After initialization, the ETR unit 200 enters a low-power sleep mode (block 703). If a fault occurs during the sleep mode (e.g., the tamper sensor is activated), then the process enters a wake-up block 704 followed by a transmit fault block 705. If no fault occurs during the sleep period, then when the specified sleep period has expired, the process enters a block 706 where the ETR unit 200 takes a sensor reading from the sensor(s) 201. The sensor data is subsequently sent to the monitoring reading device in a report block 707. After reporting, the ETR unit 200 enters a listen block 708 where the ETR unit 200 listens for a relatively short period of time for instructions from monitoring computer 708. If (block 709) an instruction is received, then the ETR unit 200 performs the instructions (block 710), otherwise, the process returns to the sleep block 703. In one embodiment, the sensor 201 and transceiver 203 are normally powered down. The controller 202 powers up the sensor 201 during execution of the block 706. The controller 202 powers up the transceiver 203 during execution of the blocks 705, 707, and 708. The monitoring reading device can send instructions to the ETR unit 200 to change the sleep period used in block 703, the listen period used in block 708, etc.

In one embodiment, the ETR unit transmits sensor data until a handshaking-type acknowledgement is received. Thus, rather than sleep if no instructions or acknowledgements are received after transmission (e.g., after the decision block 613 or 709) the ETR unit 200 retransmits its data and waits for an acknowledgement. The ETR unit 200 continues to transmit data and wait for an acknowledgement until an acknowledgement is received. In one embodiment, the ETR unit accepts an acknowledgement from a reading device and it then becomes the responsibility of the reading device to make sure that the data is forwarded to the reading device. In one embodiment, the reading device does not generate the acknowledgement, but rather forwards an acknowledgement from the reading device to the ETR unit 200. The two-way communication ability of the ETR unit 200 provides the capability for the reading device to control the operation of the ETR unit 200 and also provides the capability for robust handshaking-type communication between the ETR unit 200 and the reading device.

Regardless of the normal operating mode of the ETR unit 200 (e.g., using the flowcharts of FIGS. 6, 7, or other modes) in one embodiment, the monitoring reading device can instruct the ETR unit 200 to operate in a relatively continuous mode where the sensor repeatedly takes sensor readings and transmits the readings to the monitoring reading device.

In one embodiment, a shutoff valve is provided, so that the monitoring system 100 can shutoff the water supply when a leak and/or energy usage is detected. In one embodiment, the shutoff valve is controlled by the ETR unit 200. In one embodiment, the ETR unit 200 receives instructions from the reading device to shut off the water supply. Similarly, in one embodiment, the ETR unit 200 controls a gas shutoff valve to shut off the gas supply when a gas leaks is detected.

In one embodiment, data from the ETR unit 200 is provided to a monitoring system. The monitoring system gathers water (or other utility) usage data from each of the meters and records utility usage through each meter. In one embodiment, water leaks are detected by examining data from the ETR unit 200 for the lowest flow rate. An occasional flow rate of zero indicates that there are no leaks. If the flow rate never drops to zero, then either there is a leak or some appliance or system is using water continuously (e.g., a drip irrigation system). If the use never drops to zero, and there is a leak, then the lowest flow rate likely corresponds to the leak flow rate. If the use never drops to zero, then the monitoring system (or utility) can warn the building owner or manager that a leak is suspected. AMR systems where the ETR unit sleeps until awakened by a "wake up" signal and then read the utility meter (e.g., once per month) cannot be used for leak detection because such systems only obtain accumulated data from the mechanical digital indicators 102 on the meter. Leak detection is based on relatively continuous monitoring (or monitoring at regular or random intervals) such that flow during times when only a leak is flowing is measured. Moreover, detecting leaks by looking for continuous flow does not provide information on the severity of the leak, since merely knowing that water flowed continuously does not indicate what the lowest flow rate is. In one embodiment, the monitoring system calculates water wasted by leaks in the system according to the severity of the leak (e.g., water wasted per day is approximately the leak flow rate per hour times 24). In one embodiment, the monitoring system provides graphs of utility usage by day, by time of day, by month, etc.

Figure 8A:
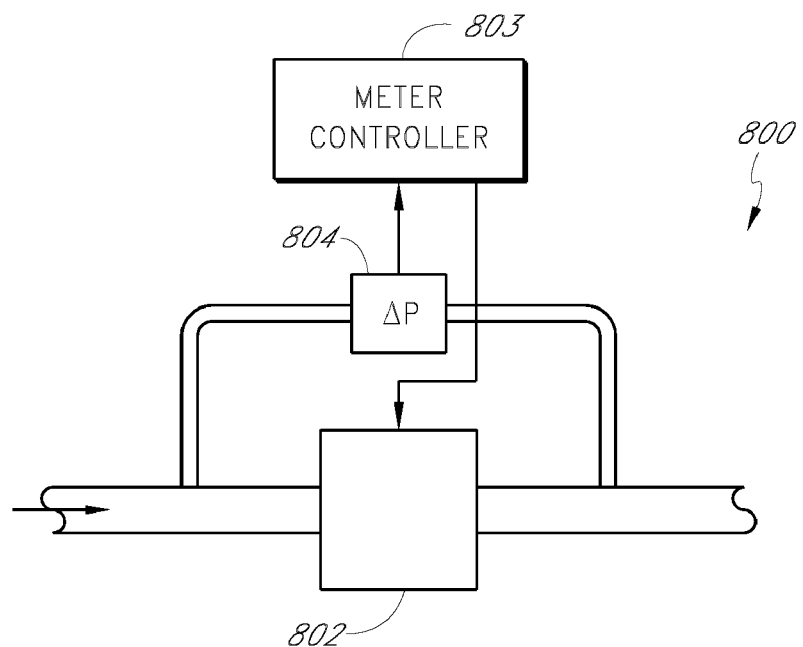
FIG. 8A shows one embodiment of a low-flow sensor adapted to measuring leaks in plumbing systems by using a differential pressure sensor.

In some cases, conventional water meters used for providing water to buildings do not read accurately, if at all, at the lowest flow rates produced by a small leak. FIG. 8A shows one embodiment of a low-flow sensor system 800 for measuring leaks in plumbing systems by using a differential pressure sensor 804 (see e.g., FIG. 8B). An electrically-controlled valve 802 is provided to a water service line. The first input of the differential pressure sensor 804 is provided to the water service line on the input side of the valve 802, and a second input of the differential pressure sensor 804 is provided to the water service line on the output side of the valve 802. A controller 803 is provided to the valve 802 and the pressure sensor 804. In one embodiment, the differential pressure sensor provides an output signal that is related to the pressure difference between the first input and the second input. In one embodiment, the pressure sensor is configured as a switch that opens or closes when the pressure differential exceeds a specified value.

To test for leaks, the controller 803 sends an electrical signal to close the valve 802. When the valve is closed, the controller 803 obtains sensor data from the sensor 804. If there is a leak in the plumbing attached to the output side of the valve 802, then a pressure difference will be measured by the sensor 804. The severity of the leak is related to the speed at which the pressure differential increases. If the sensor 804 is configured as a switch, then the severity of the leak is related to the amount of time that elapses between the closing of the valve 802 and the operation of the switch in response to the pressure differential. Since water is a relatively non-compressible fluid, a pressure difference across the valve 802 will arise relatively quickly, and thus the meter controller only needs to close the valve for a relatively short period of time. In one embodiment, the controller 803 immediately opens the valve 802 upon reaching a specified pressure differential. A substantial increase in the slope of the differential pressure curve (i.e., the change in differential pressure versus time) is typically indicative of the opening of a valve downstream of the valve 802. Thus, in one embodiment, the controller 803 immediately opens the valve 802 upon sensing such a change in slope.

If water is flowing in the water service line (when the valve 802 is open), then a relatively small pressure differential will be measured by the sensor 804. If no water (or very little water) is flowing in the water service line, then no pressure differential will be measured by the sensor 804. In one embodiment, the controller 803 does not close the valve 802 when the differential pressure measured by the pressure sensor 804 suggests that water is flowing in the line. In one embodiment, when the valve 802 is closed during a leak test, the controller 803 senses when a water valve downstream of the valve 802 has been opened because of the relatively sudden increase in the differential pressure sensed by the pressure sensor 804. When such an event occurs, the controller 803 terminates the leak test by immediately opening the valve 802.

In one embodiment the controller "tests" for water flow by partially closing the valve 802. If water is flowing in the water service line, then partial closure of the valve 802 will cause the differential pressure sensor 804 to sense a pressure difference. By contrast, if only leakage water is flowing in the water service line, the partial closure of the valve 802 will not cause a significant pressure differential. If, through partial closure, the controller 803 determines that water is flowing in the line, then the leak test is terminated. If, through partial closure, the controller 803 determines that no water (or very little water) is flowing in the line, then the valve 802 is fully closed for the leak test. Partial closure allows the low-flow system 800 to test for leaks without substantially impacting normal water usage.

Figure 8B:
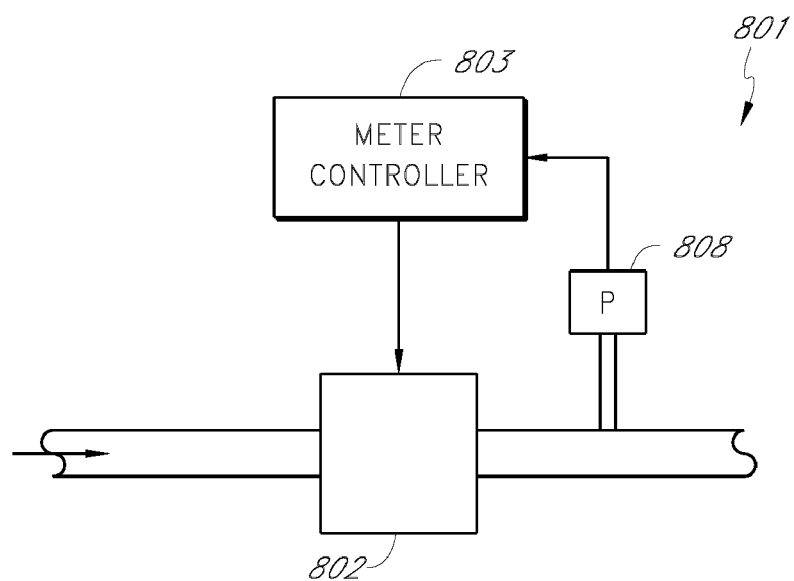
FIG. 8B shows one embodiment of a low-flow sensor adapted to measuring leaks in plumbing systems by using a pressure sensor.

FIG. 8B shows one embodiment of a low-flow sensor system 801 for measuring leaks in plumbing systems by using a pressure sensor 808. The system 801 includes the electrically-controlled valve 802 and the controller 803. The pressure sensor 808 is provided to the water service line on the output side of the valve 802. The output of the pressure sensor 808 is provided to the controller 803. In one embodiment, the pressure sensor 808 provides an output signal that is related to the pressure in the output line. In one embodiment, the pressure sensor is configured as a switch that opens or closes when the pressure exceeds a specified value.

To test for leaks, the controller 803 sends an electrical signal to close the valve 802. When the valve is closed, the controller 803 obtains sensor data from the sensor 808. If there is a leak in the plumbing attached to the output side of the valve 802, then a drop will be measured by the sensor 804. The severity of the leak is related to the speed at which the pressure drops. If the sensor 808 is configured as a switch, then the severity of the leak is related to the amount of time that elapses between the closing of the valve 802 and the operation of the switch in response to the pressure drop. Since water is a relatively non-compressible fluid, the pressure will drop relatively quickly, and thus the meter controller only needs to close the valve for a relatively short period of time. In one embodiment, the controller 803 measures a relative pressure drop by obtaining a pressure reading from the pressure sensor 808 before closing the valve. The controller 803 can then compare the difference in the pressure measured by the sensor 808 before and after the closing of the valve 802.

If water is flowing in the water service line (when the valve 802 is open), then the pressure measured by the sensor 808 will be relatively less than the static pressure in the line. In one embodiment, the sensor determines a static pressure by obtaining sensor data readings from the pressure sensor 808 over a period of time and determining a maximum steady-state (non-transient) pressure. In one embodiment, the controller 803 does not close the valve 802 when the pressure measured by the pressure sensor 808 is relatively lower than the static pressure (by a threshold amount). In one embodiment, when the valve 802 is closed during a leak test, the controller 803 senses when a water valve downstream of the valve 802 has been opened because of the relatively sudden pressure drop sensed by the pressure sensor 808. When such an event occurs, the controller 803 terminates the leak test by immediately opening the valve 802. In one embodiment, the controller 803 immediately opens the valve 802 upon reaching a specified relative pressure drop. A substantial increase in the slope of the pressure curve (i.e., the change in pressure versus time) is typically indicative of the opening of a valve downstream of the valve 802. Thus, in one embodiment, the controller 803 immediately opens the valve 802 upon sensing such a change in slope.

One of ordinary skill in the art will recognize that the systems 800, 801 can also be used for measuring leaks in gas systems (e.g., natural gas, propane, etc.).

The low-flow sensor systems 800, 801 can be used alone or in connection with an AMR water meter as described in connection with FIGS. 1A and 2-7. In one embodiment, the low-flow sensor systems 800, 801 are configured to test for leaks when the AMR water meter determines that little or no water is flowing.

Figure 9A:
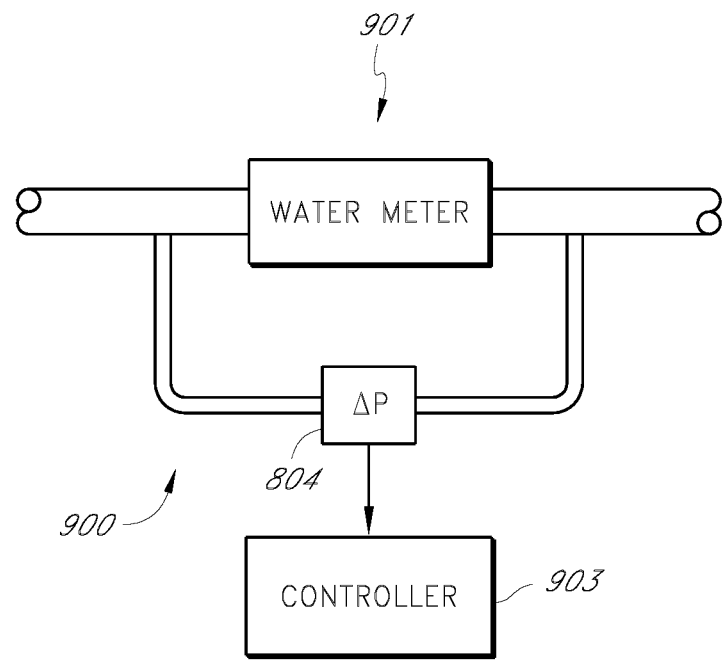
FIG. 9A shows one embodiment of a system 900 to measure leaks in plumbing systems in connection with a water meter 901.

FIG. 9A shows one embodiment of a system 900 to measure leaks in plumbing systems in connection with a water meter 901. The water meter 901 can be a conventional water meter or an AMR water meter (as shown). The differential pressure sensor 804 is provided to the input and output of the water meter 901. The water meter 901 produces a pressure drop when water is flowing through the meter, and the water meter 901 produces no pressure drop when no water is flowing through the meter. Thus, if there are not leaks in the system fed by the meter 901, during periods of no water flow, the differential pressure sensor 804 will measure substantially no pressure difference. The pressure difference measured by the pressure sensor 804 when a leak exists will depend somewhat on the position of the turbine blades (or impeller) blades in the meter 901 when the meter stops turning. In some cases, for small leaks, there is not enough water flowing through the meter 901 to cause the impeller to turn. Moreover, for a given flow rate due to a leak, the pressure drop across the meter 901 varies somewhat depending on the orientation of the impeller. Thus, in one embodiment, the controller 903 determines the likelihood of a leak based on a statistical analysis. Over a period of time, the impeller blades will stop in various orientations. The controller 903 takes readings over a number of days to determine the statistically lowest pressure difference. The statistically lowest pressure difference is then related to the magnitude of any leaks in the system.

Figure 9B:
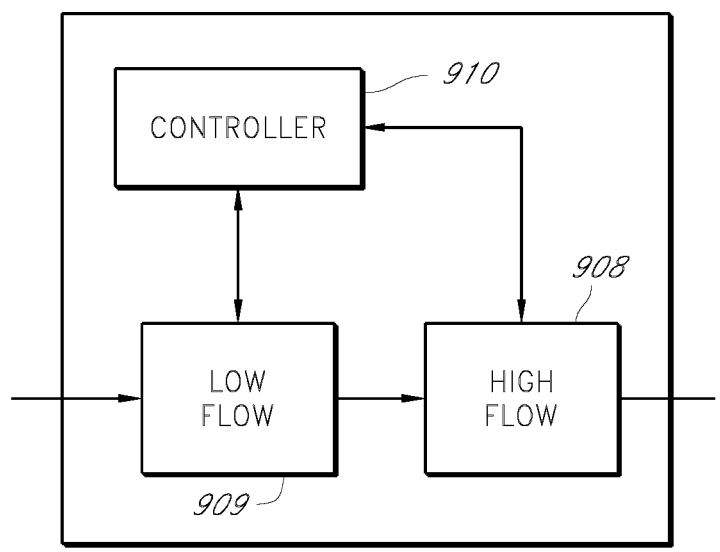
FIG. 9B shows an integrated low-flow/high-flow meter system that provides AMR metering, leak detection, and water shutoff functions.

FIG. 9B shows a block diagram of an integrated low-flow/high-flow meter system 901 that provides AMR metering, leak detection, and water shutoff functions. In the system 901, a relatively low-flow sensor 909, such as, for example, the low-flow sensor systems 800 or 801 is provided in series with a conventional water meter apparatus 908. The relatively low-flow sensor 909 and the meter apparatus 908 are provided to a controller 910. In one embodiment, the controller 910 provides AMR functions. In one embodiment, the controller 910 periodically takes low-flow sensor readings using the low-flow sensor 909 when the meter apparatus 908 indicates that no water is flowing. In one embodiment, the controller 910 uses an electrically-controlled valve in the low-flow sensor 909 to shut off water through the system 910. In one embodiment, the controller 910 shuts off the water in response to a command from an external source. In one embodiment, the controller 910 shuts off the water in response to an apparent plumbing system malfunction (e.g., a significant and continuous flow of water indicative of a break in a water line or failure of a valve, a significant leak, etc.).

Figure 10:
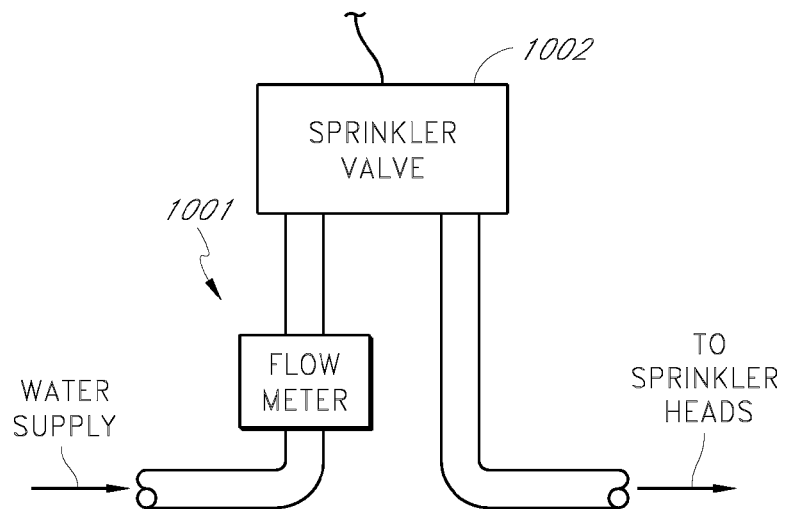
FIG. 10 shows a water metering system adapted to monitoring water use and/or leaks in connection with a sprinkler valve that provides water to one or more sprinkler heads.

FIG. 10 shows a water metering system 1000 adapted to monitoring water use and/or leaks in connection with a sprinkler valve that provides water to one or more sprinkler heads. In the system 1000, a flow meter 1001 is provided in series with a sprinkler valve 1002. In one embodiment, the flow meter 1001 is configured as an AMR meter (e.g., such as the meter shown in FIG. 1A, an ultrasonic flow meter, or other meter technology). In one embodiment, the flow meter 1001 is configured as a low-flow meter system, such as the low-flow meter systems 800, 801. In one embodiment, the electronically-controlled valve 802 shown in FIGS. 8A and 8B is used as the sprinkler valve 1002. In one embodiment, the low-flow/high-flow meter system 901 is used to provide water to one or more sprinkler heads (where the system 901 provides the functions of the flow meter 1001 and sprinkler valve 1002.

Figure 11:
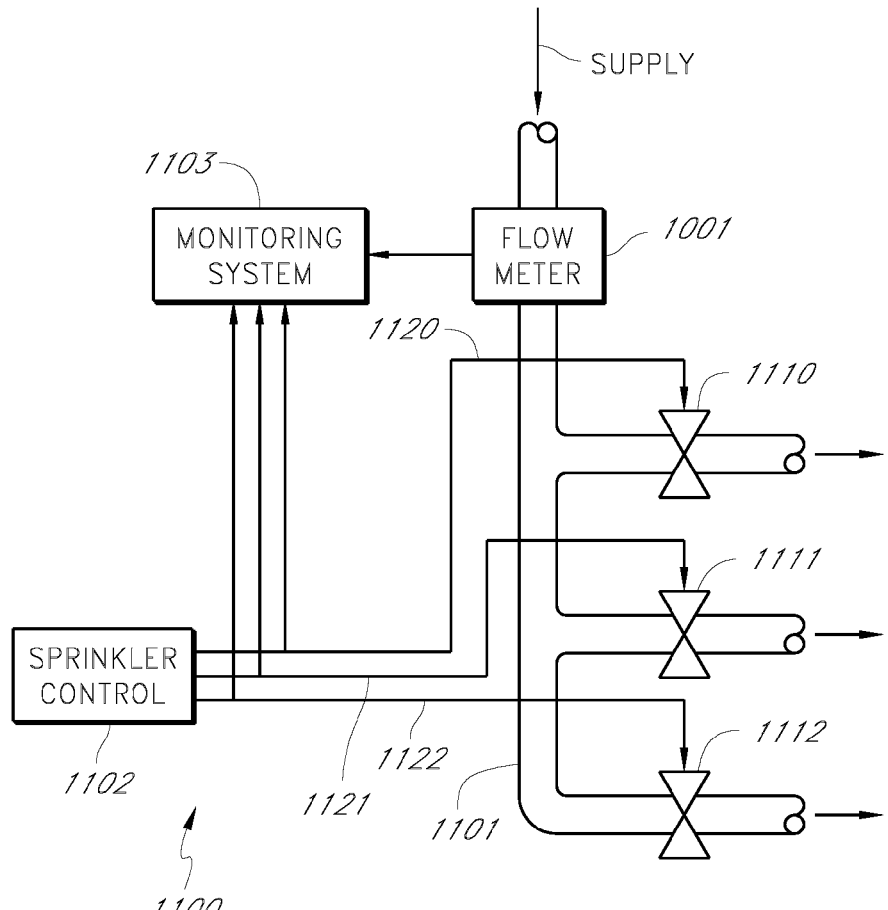
FIG. 11 shows a water metering system adapted to monitoring water use and/or leaks in connection with a manifold having a plurality of sprinkler valves that provides water to one or more sprinkler heads.

FIG. 11 shows a water metering system 1100 adapted to monitoring water use and/or leaks wherein the flow meter 1001 is provided to a manifold 1101. The manifold 1101 is provided to sprinkler valves 1110, 1111 and 1112. A sprinkler controller 1102 provides control signals 1120-1122 to the sprinkler valves 1110-1112, respectively. The control signals are also provided to a monitoring system 1103. An output from the flow meter 1001 is also provided to the monitoring system 1103. One of ordinary skill in the art will recognize that the functions of the controller 1102 and the monitoring system 1103 can be combined. The monitoring system 1103 monitors and records water flow through each of the valves 1110-1112 by recording water flow data from the flow meter 1001 when each of the valves 1110-1112 is opened.

The systems 1000 and 1100 allow a building owner or other party to monitor and track water use by a sprinkler or irrigation system on a zone by zone basis. The systems 1000 and 1100 can report damaged or missing sprinkler heads because water flow is generally excessive through a damaged or missing head. The systems 1000 and 1100 can also report clogged heads because water flow through a clogged head is below normal.

Figure 12:
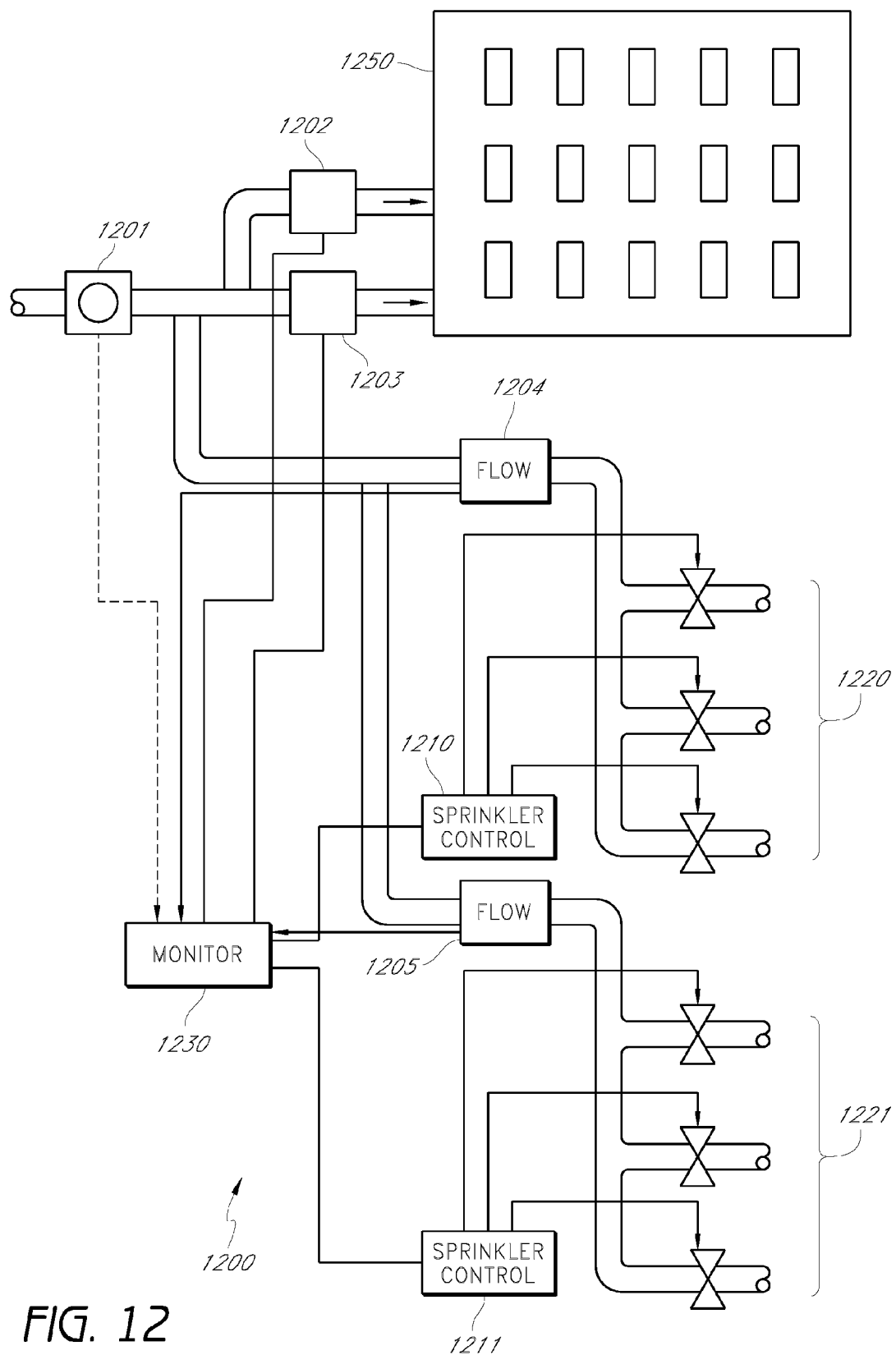
FIG. 12 shows a water metering system adapted to monitoring water use and/or leaks in connection with a commercial structure (or residential structure) having one or more water usage zones and one or more sprinkler zones.

FIG. 12 shows a water metering system 1200 combining various elements from FIGS. 1-11 for monitoring water use and/or leaks in connection with a commercial structure (or residential structure) 1250 having one or more water usage zones and one or more sprinkler zones. Water from the water utility company is provided through a main meter 1201 to the building 1250 through one or more (optional) meters 1202 and 1203. Water from the main meter 1201 is also provided to flow meters 1204 and 1205. The flow meter 1204 provides water to a manifold that services a group of sprinkler valves 1220. The flow meter 1205 provides water to a manifold that services a group of sprinkler valves 1221. The sprinkler valves 1220 are controlled by a sprinkler controller 1210, and the sprinkler valves 1221 are controlled by a sprinkler controller 1211. The sprinkler control lines, and meters 1202-1205 are provided to a monitoring system 1230. In one embodiment, the meter 1201 is also provided to the monitoring system 1201. The flow meters 1202-1205, and optionally 1230 are configured to provide water usage data to the monitoring system 1230. In one embodiment, the flow meters 1202-1205, and optionally 1201 are configured to provide low-flow sensing for detecting leaks.

The monitoring system 1230 gathers water usage data from each of the meters and records water usage through each meter. In one embodiment, the monitoring system 1230 calculates water wasted by leaks in the system according to the severity of the leak and the amount of time the leak has existed. In one embodiment, the monitoring system 1230 provides graphs of water usage by zone, by day, by time of day, by month, etc.

Various types of flow meters or flow sensors can be used measure the flow of water or gas or other utilities in connection with the leak detection and monitoring techniques described herein. The traditional water meter and gas meters are based on turbines or impellers that spin in response to flow. Other types of flow meters (flow sensors) can also be used, such as, for example, a differential-pressure flow meter, an orifice plate flow meter, a venturi tube flow sensor, a flow nozzle flow meter, a variable area flow meter or rotameter, a velocity flow meters, a calorimetric flow meter, a turbine flow meter, a vortex flow meter, an electromagnetic flow meter, a positive displacement flow meter, a mass flow meter, a thermal flow meter, etc., and combinations thereof.

It will be evident to those skilled in the art that the invention is not limited to the details of the foregoing illustrated embodiments and that the present invention may be embodied in other specific forms without departing from the spirit or essential attributed thereof; furthermore, various omissions, substitutions and changes may be made without departing from the spirit of the inventions. For example, although specific embodiments are described in terms of the 900 MHz frequency band, one of ordinary skill in the art will recognize that frequency bands above and below 900 MHz can be used as well. The wireless system can be configured to operate on one or more frequency bands, such as, for example, the HF band, the VHF band, the UHF band, the Microwave band, the Millimeter wave band, etc. One of ordinary skill in the art will further recognize that techniques other than spread spectrum can also be used and/or can be use instead spread spectrum. The modulation uses is not limited to any particular modulation method, such that modulation scheme used can be, for example, frequency modulation, phase modulation, amplitude modulation, combinations thereof, etc. The foregoing description of the embodiments is therefore to be considered in all respects as illustrative and not restrictive, with the scope of the invention being delineated by the appended claims and their equivalents.

What is claimed is:

1. A sensor system, comprising:
a monitoring unit comprising at least one sensor configured to sense a utility meter reading, said monitoring unit configured to monitor said utility meter at desired intervals, to record a minimum utility usage and to determine a likelihood of a utility leak, said monitoring unit configured to report data measured by said at least one sensor in response to a read request.

2. The sensor system of claim 1, wherein said at least one sensor comprises an optical sensor.

3. The sensor system of claim 1, wherein said at least one sensor comprises an imaging sensor.

4. The sensor system of claim 1, wherein said at least one sensor comprises an illumination source.

5. The sensor system of claim 1, wherein said at least one sensor comprises an acoustic sensor.

6. The sensor system of claim 1, wherein said at least one sensor comprises an electronic utility meter interface.

7. The sensor system of claim 1, wherein said at least one sensor comprises a recorder interface.

8. The sensor system of claim 1, wherein said at least one sensor comprises a water flow sensor.

9. The sensor system of claim 1, wherein said at least one sensor comprises a gas flow sensor.

10. The sensor system of claim 1, wherein said sensor system determines a likelihood of a utility leak according to a threshold test.

11. The sensor system of claim 10, wherein said threshold test comprises a high threshold level.

12. The sensor system of claim 10, wherein said threshold test comprises a low threshold level.

13. The sensor system of claim 10, wherein said threshold test comprises an inner threshold range.

14. The sensor system of claim 10, wherein said threshold test comprises an outer threshold range.

15. The sensor system of claim 1, wherein said monitoring unit is configured to receive an instruction to change a status reporting interval.

16. The sensor system of claim 1, wherein said monitoring unit is configured to receive an instruction to change a sensor data reporting interval.

* * * * *

UNITED STATES PATENT AND TRADEMARK OFFICE
CERTIFICATE OF CORRECTION

PATENT NO. : 7,228,726 B2  Page 1 of 1
APPLICATION NO. : 10/948628
DATED : June 12, 2007
INVENTOR(S) : Lawrence Kates It is certified that error appears in the above-identified patent and that said Letters Patent is hereby corrected as shown below:

In Column 3 at line 56, after "In" delete "on".

In Column 3 at line 66, after "example," delete "a".

Signed and Sealed this

Twenty-ninth Day of April, 2008

JON W. DUDAS
*Director of the United States Patent and Trademark Office*